Sept. 29, 1964   M. DANGAUTHIER   3,150,543
MOTOR-CHANGE GEAR UNIT
Filed Jan. 10, 1963   2 Sheets-Sheet 1
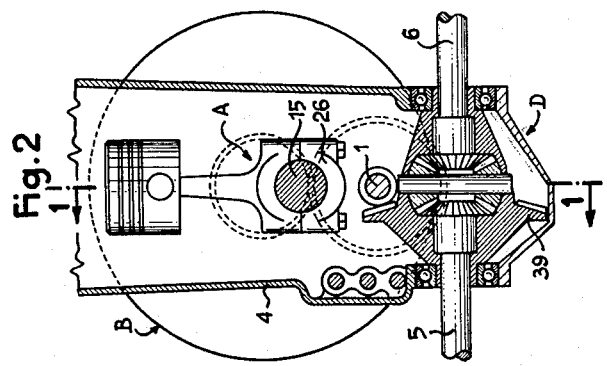
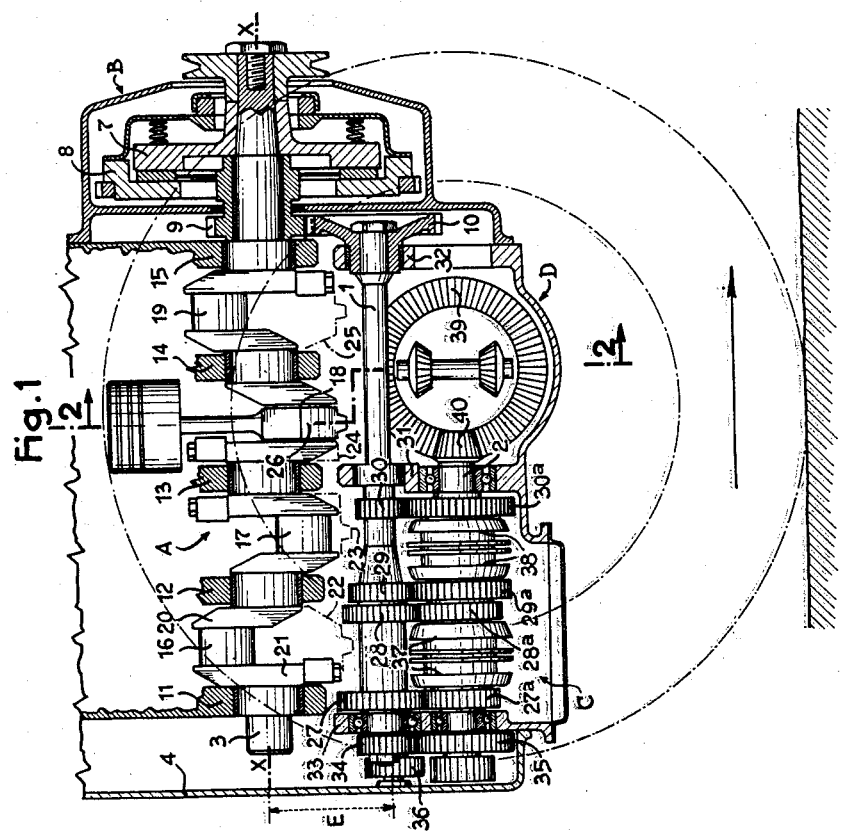
INVENTOR
MARCEL DANGAUTHIER
BY LeBlanc & Shur
ATTORNEYS Sept. 29, 1964  M. DANGAUTHIER  3,150,543
MOTOR-CHANGE GEAR UNIT
Filed Jan. 10, 1963  2 Sheets-Sheet 2
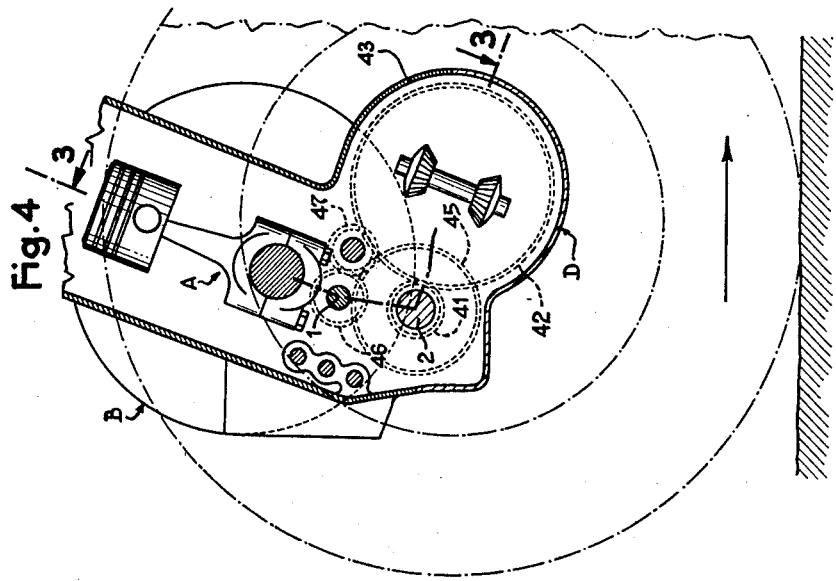
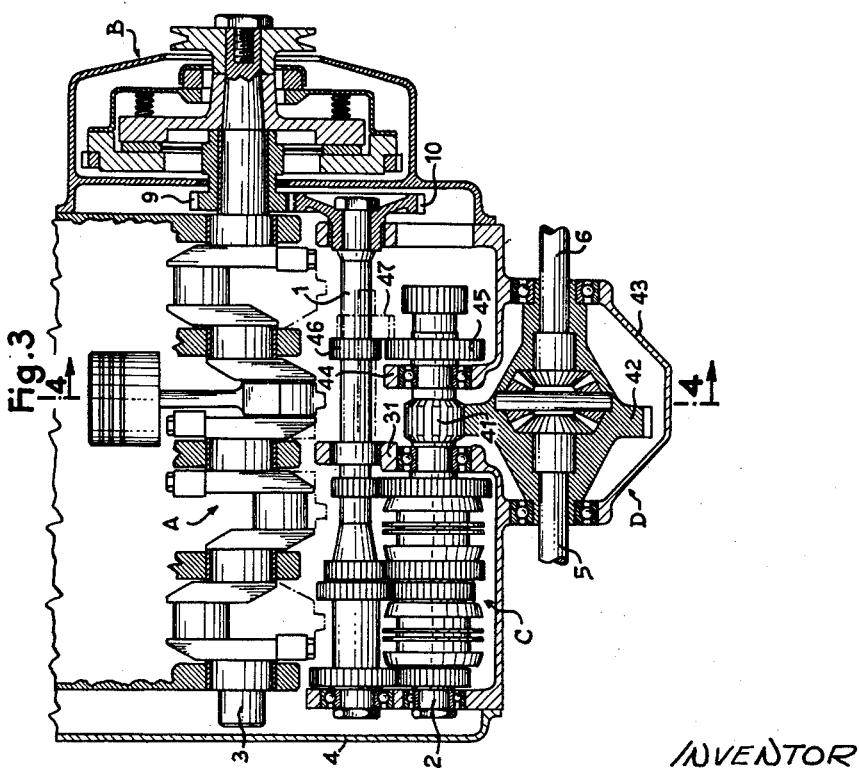
INVENTOR
MARCEL DANGAUTHIER
BY
ATTORNEYS

United States Patent Office 3,150,543
Patented Sept. 29, 1964

3,150,543
MOTOR-CHANGE GEAR UNIT
Marcel Dangauthier, Paris, France, assignor to Societe d'Etudes et d'Applications Industrielles Commerciales et Immobilieres "Inter-Technique," Paris, France
Filed Jan. 10, 1963, Ser. No. 250,708
7 Claims. (Cl. 74—700)

The invention relates to motor-change gear units in which the change gear is united with the motor, its shafts being parallel with the crankshaft, the differential being if desired itself united with the gearbox so as to provide a compact assembly.

In order to obtain maximum compactness Ljungström's French Patent No. 735,407 of March 9, 1932, discloses an arrangement in which the gearbox is disposed within the case of the motor and the wheel-carrying shafts of the differential are contained in the plane of the output shaft of the gearbox. However, the clutch is disposed between the crankshaft and the gear train driving the input shaft of the gearbox and the necessarily large diameter of the clutch limits bringing the shafts of the gearbox near to the crankshaft.

This drawback has been remedied in Hoffman's U.S. Patent No. 2,090,128 granted on August 17, 1937, by disposing the clutch at the end of the crankshaft and by driving the input shaft of the gearbox by means of a gear train located between the case of the motor and the clutch. As the latter is disposed at one end its large diameter does not oppose the close disposition of the shafts of the gearbox and the crankshaft. However, in this known arrangement, the gearbox is disposed in a case distinct from that of the motor and the partition separating them remains an obstacle to the closest possible disposition of the shafts of the gearbox and the crankshaft.

The object of the invention is to provide a construction in which, owing to a judicious relative disposition of the elements related to the adoption of a certain type of motor, the assembly can be made even more compact, thereby providing a substantial lowering of the centre of gravity.

According to one feature of the invention, the gears and the bearings of the input shaft of the gearbox and the crankpins of the crankshaft interpenetrate in such manner that the gears of largest diameter are in facing relation to the parts of the crankshaft whose throw is of minimum radius and vice versa, the crankpins, big ends and counterweights of the crankshaft being located between the gears of the gearbox.

Another feature of the invention resides, in the foregoing combination, in the fact of employing a motor of the so-called "oversquare" type (the bore/stroke ratio being greater than 1) having preferably five bearings for a motor of four cylinders so as to reduce to a minimum the throw of the off-center parts of the crankshaft.

According to another feature of the invention, the axes of the gears of the differential are contained in the plane of the driven shaft of the gearbox and the differential is located between the gear train driving the input shaft of the gearbox on the clutch side and the gears pertaining to the forward speeds of the gearbox, thereby enabling the differential to be located forward of the center of gravity of the unit.

If the motor instead of being disposed longitudinally of the vehicle is disposed transversely thereof, the differential is preferably disposed on one side of the motor, its ring gear or crown-wheel being driven by an intermediate gear of the gearbox whereas the cylinders are inclined so as to lower the center of gravity of the unit and permit location of the equipment and controls of the motor and gearbox without increasing the overall size of the vehicle.

Further features and advantages of the invention will be apparent from the ensuing description, with reference to the accompanying drawings to which the invention is in no way limited.

In the drawings:

FIG. 1 is a sectional view, taken along line 1—1 of FIG. 2 of a motor-gearbox-differential unit disposed longitudinally of the chassis.

FIG. 2 is a cross-sectional view taken along line 2—2 of FIG. 1;

FIG. 3 is a sectional view taken along line 3—3 of FIG. 4 of a unit disposed transversely of the chassis, and FIG. 4 is a sectional view taken along line 4—4 of FIG. 3.

In the embodiment shown in FIGS. 1 and 2, the reference character A represents the crankshaft, B the clutch, C the gearbox and D the differential of a motor-gearbox-differential unit in which the gearbox C is united with the motor, its shafts 1 and 2 being parallel with the axis X—X of the crankshaft 3. The gearbox X is contained in the case 4 of the motor and the wheel-carrying shafts 5 and 6 of the differential are contained in the plane of the output shaft 2 of the gearbox C. The clutch B is disposed at the end of the crankshaft 3, the driving element 7 being keyed on the crankshaft and the driven element 8 being rigid with a gear 9 meshed with a gear 10 keyed on the input shaft 1 of the gearbox C. Owing to the lateral effect of the clutch of large diameter the distance E between the axis X—X and the axis of the input shaft 1 can be materially reduced.

According to the invention the stepped gears of the shaft 1 and the bearings thereof on the one hand and the crankpins of the crankshaft on the other interpenetrate, this being made possible by absence of the partition between the gearbox and the motor, the latter being preferably an oversquare motor, for example a four-cylinder motor whose crankshaft has five bearings so that the center distance E is reduced to a minimum.

In the illustrated embodiment, the five bearings of the crankshaft are shown at 11, 12, 13, 14, 15, and the four crankpins at 16, 17, 18 and 19. Each crankpin is located between an ordinary crank such as 20 and a balancing counterweight crank such as 21 and the surfaces generated by the rotation of the crankpins, and the big ends of the piston rods such as 26, are shown at 22, 23, 24 and 25.

The invention resides in taking advantage of the recesses in said generated surfaces, for example in the region of the intermediate bearings 11 to 15 so as to dispose therein the gears or bearings of the input shaft 1 of the gearbox C.

In the illustrated embodiment the gear 27 of the fourth speed is in facing relation to or alignment with the bearing 11 and the gears 28 and 29 of the third and second speed are in facing relation to the bearing 12. As the gear 30 of the first speed is of small diameter it can be located where desired. The bearings 31 and 32 of the shaft 1 are disposed in facing relation to the bearings 13 and 15 of the crankshaft respectively. Reference numeral 33 shows the end bearing of the shaft 1 whose positioning presents no problem and 34 and 35 designate the gears of the reverse speed which mesh with a reverse speed sliding gear 36.

The gears 27a, 28a, 29a and 30a are disposed on the secondary shaft 2 and mesh with the gears 27, 28, 29 and 30 and can be selectively made rigid with the shaft 2 by the sleeves 37, 38 of conventional sliding elements.

The motor is preferably of the type having a very short stroke and large bore so as to reduce the throw of the crankpins and the downward projection of the surfaces 22–25. In this way the center distance E can be reduced to a minimum.

Location of the axes of the wheels 5, 6 in the plane of the shaft 2 of the gearbox necessitates providing room for the differential ring gear or crown wheel 39, which meshes with a bevel gear 40 keyed on the end of the shaft 2. The optimum position for the purpose of suitably locating the axis of the wheels relative to the vertical through the center of gravity of the motor-gearbox-differential unit is the space available between the set of gears 9, 10 on the clutch side and the forward speed gears of the shaft 1, as shown in the drawing.

It is clear that in such a unit the height of the center of gravity above the axes of the wheels can be reduced to a very small value which is a great advantage in the road holding properties of the vehicle.

If instead of disposing the motor longitudinally of the chassis this motor is disposed transversely thereof as shown in FIGS. 3 and 4, the same relative arrangement of the motor and gearbox can be adopted with, if need be, slight variations which will be described hereinafter, but the differential must of course be arranged differently.

In the arrangement shown in FIGS. 3 and 4, the output shaft 2 of the gearbox is extended beyond the bearing 31 and carries a gear 41 in mesh with the ring gear 42 of the differential D, the shafts 5 and 6 for the wheels being in this case parallel with the shaft 2. In order to reduce to a minimum the height of the center of gravity of the unit above the axis of the wheels, the case 43 of the differential forms a lateral extension of the case 4 of the motor. For the purpose of lowering the center of gravity of the unit and permitting location of the equipment of the motor and gearbox without decreasing the overall length of the vehicle, the axes of the cylinders can be inclined relative to the vertical toward the differential (as shown in FIG. 3).

In the illustrated embodiment, owing to the space available between the forward speed gears and the gear train 9, 10 driving the input shaft 1 of the gearbox, it is possible to dispose therein the reverse speed gears. To this end the shaft 2 is supported by a bearing 44 beyond which said shaft carries a reverse speed gear 45 in facing relation to a reverse speed gear 46 keyond on the shaft, the reference numeral 47 designating the reverse speed sliding gear.

Although specific embodiments of the invention have been described, many modifications and changes may be made therein without departing from the scope of the invention as defined in the appended claims.

Thus, the differential need not form part of the motor-gearbox unit, for example it could be connected thereto by a transmission shaft.

Having now described my invention what I claim as new and desire to secure by Letters Patent is:

1. A motor-gearbox unit comprising a case, a motor and a gear-box mechanism united together and housed in said case; said motor comprising a number of first bearings solid with said case, a crankshaft having at least four crankpins and carried by said first bearings, piston rods having big ends mounted on said crankpins, and counterweights solid with said crankshaft; said gear-box mechanism comprising a number of second bearings solid with said case, an input shaft carried by said second bearings, gears fixed on said input shaft, some of said gears having large diameters relative to the other gears, the axes of said crankshaft and said input shaft being parallel; a clutch being mounted on one end portion of said crankshaft; said second bearings and said gears being so arranged relative to said crankpins that said gears having relatively large diameters are in facing relation to the parts of the crankshaft having no throw, the crankpin, big ends of the piston rods and counterweights of the crankshaft being located between said gears of the gear box.

2. A motor-gearbox unit comprising a case, a motor and a gear-box mechanism united together and housed in said case; said motor comprising five first bearings solid with said case, a crankshaft having four crankpins carried by said first bearings, piston rods having big ends mounted on said crankpins, and counterweights soild with said crankshaft; said gear-box mechanism comprising a number of second bearings solid with said case, an input shaft carried by said second bearings, gears fixed on said input shaft, some of said gears having large diameters relative to the other gears, the axes of said crankshaft and said input shaft being parallel; a clutch being mounted on one end portion of said crankshaft; said second bearings and said gears being so arranged relative to said crankpins that said gears having relatively large diameters are in facing relation to the parts of the crankshaft having no throw, the crankpins, big ends of the piston rods and counterweights of the crankshaft beign located between said gears of the gear box.

3. A motor-gearbox unit according to claim 1, wherein the motor is of the type having a ratio bore/stroke greater than 1.

4. A motor-gearbox unit comprising a case, a motor having at least four cylinders and adapted to be mounted longitudinally on a vehicle, and a gear-box mechanism, said motor and gear-box mechanism being united together and housed in said case; said motor comprising a number of first bearings solid with said case, a crankshaft having at least four crankpins and carried by said first bearings, piston rods with big ends mounted on said crankpins, and counterweights solid with said crankshaft; said gearbox mechanism comprising a number of second bearings solid with said case, an input shaft carried by said second bearings, gears fixed on said input shaft, some of said gears having large diameters relative to the other gears, the axes of said crankshaft and said input shaft being parallel; a clutch being mounted on one end portion of said crankshaft; said second bearings and said gears being so arranged relative to said crankpins that said gears having relatively large diameters are in facing relation to the parts of the crankshaft having no throw, the crankpins, big ends of the piston rods and counterweights of the crankshaft being located between said gears of the gear-box; said gear-box mechanism further comprising a driven shaft parallel with said input shaft, a pair of gears mounted on said crankshaft and input shaft on the clutch side to drive the input shaft, and gears pertaining to the forward speed ratios of the gearbox; said unit further comprising a differential driving wheel output shaft arranged in the horizontal plane of said driven shaft, said differential being located between said pair of gears and said gears for the forward speeds.

5. A motor-gearbox comprising a case, a motor having at least four cylinders and adapted to be mounted transversely on a vehicle, and a gear-box mechanism, said motor and gear-box mechanism being united together and housed in said case; said motor comprising a number of first bearings solid with said case, a crankshaft having at least four crankpins and carried by said first bearings, piston rods with big ends mounted on said crankpins, and counterweights solid with said crankshaft; said gear-box mechanism comprising a number of second bearings solid with said case, an input shaft carried by said second bearings, gears fixed on said input shaft, some of said gears having large diameters relative to the other gears, the axes of said crankshaft and said input shaft being parallel, and a clutch being mounted on one end portion of said crankshaft; said second bearings and said gears being so arranged relative to said crankpins that said gears having relatively large diameters are in facing relation to the parts of the crankshaft having no throw, the crankpins, big ends of the piston rods and counterweights of the crankshaft being located between said gears of the gear-box; said gear-box mechanism further comprising a driven shaft parallel with said input shaft, a pair of gears mounter on said crankshaft and input shaft on the clutch side to drive the input shaft, and gears pertaining to the forward speed ratios of the gear-box; said unit further comprising a differential comprising a ring gear meshing with an intermediary gear on said driven shaft.

6. A motor-gearbox unit according to claim 5 wherein the cylinders are at an angle with the vertical so as to lower the centre of gravity of the unit and permit location of the equipment of the motor and gear-box without increasing the overall longitudinal size of said unit.

7. A motor-gearbox unit according to claim 5 wherein the driven shaft is located on the side of the gear-box opposite to the clutch, and said intermediary gear is located substantially midway of the overall length of said unit, whereby said intermediary gear which drives the ring gear of the differential is substantially equally spaced from the two wheels of the vehicle.

References Cited in the file of this patent

UNITED STATES PATENTS

| 2,913,927 | Issigonis | Nov. 24, 1959 |
| 3,017,787 | Payne | Jan. 23, 1962 |

FOREIGN PATENTS

| 571,011 | Italy | Dec. 20, 1957 |
| 762,651 | Great Britain | Dec. 5, 1956 |